US012717621B2

(12) United States Patent
Goennheimer

(10) Patent No.: US 12,717,621 B2
(45) Date of Patent: Aug. 25, 2026

(54) TRANSPARENTLY EXECUTING ACTIONS WITHIN A CONTAINERIZED CLOUD ENVIRONMENT

(71) Applicant: SAP SE, Walldorf (DE)

(72) Inventor: Joachim Goennheimer, Walldorf (DE)

(73) Assignee: SAP SE, Walldorf (DE)

( * ) Notice: Subject to any disclaimer, the term of this patent is extended or adjusted under 35 U.S.C. 154(b) by 598 days.

(21) Appl. No.: 18/072,030

(22) Filed: Nov. 30, 2022

(65) Prior Publication Data

US 2024/0176659 A1 May 30, 2024

(51) Int. Cl.
*G06F 3/00* (2006.01)
*G06F 9/50* (2006.01)
*G06F 9/54* (2006.01)

(52) U.S. Cl.
CPC .............. *G06F 9/5005* (2013.01); *G06F 9/54* (2013.01)

(58) Field of Classification Search
CPC ..................................... G06F 6/48; G06F 9/48
See application file for complete search history.

(56) References Cited

U.S. PATENT DOCUMENTS 9,813,509 B1 * 11/2017 Visser ..................... G06F 9/547
10,922,090 B1 * 2/2021 Lieberman .............. G06F 9/455
10,936,725 B2 * 3/2021 Benameur ............... G06F 9/545
2012/0331519 A1 * 12/2012 Yu ........................... G06F 21/12 726/1
2013/0179460 A1 * 7/2013 Acuna ................. G06F 16/3349 707/758
2014/0006465 A1 * 1/2014 Davis .................. G06F 16/1752 707/827
2015/0172204 A1 * 6/2015 Anderson ............... H04L 47/83 709/224
2017/0102925 A1 * 4/2017 Ali ............................ G06F 8/30
2019/0155693 A1 * 5/2019 Bomma .............. G06F 11/1417
2019/0342160 A1 * 11/2019 Baddepudi ............ G06F 3/0619
2020/0150985 A1 * 5/2020 Moghaddam ....... H04L 41/0803
2020/0175157 A1 * 6/2020 Wilding .................. G06F 21/54
2020/0382441 A1 * 12/2020 Barnum ................ H04L 47/822
2021/0224145 A1 * 7/2021 Warmack ............ G06F 9/44505
2021/0382753 A1 * 12/2021 Draganov ................. G06F 9/50
2021/0382814 A1 * 12/2021 Moondhra ............ G06F 11/368
2022/0114196 A1 * 4/2022 Downey ............. G06F 21/6218
2022/0210047 A1 * 6/2022 Venkatasubbaiah .... H04L 45/02
(Continued)

FOREIGN PATENT DOCUMENTS

CN 104322010 A * 1/2015 ......... H04L 41/0846

OTHER PUBLICATIONS

Mayank Agarwal, Project CLAI: Instrumenting the Command Line as a New Environment for AI Agents. (Year: 2020).*
(Continued)

*Primary Examiner* — Lechi Truong
(74) *Attorney, Agent, or Firm* — SCHWEGMAN LUNDBERG & WOESSNER, P.A.

(57) ABSTRACT

In an example embodiment, a templating and detemplating component that allows for transparent integration with a cloud environment irrespective of the implementation is provided. It allows for two distinct ways of making changes in the cloud environment: (1) execution of commands through a command line tool; and (2) creation of custom resources by a user or system component.

17 Claims, 6 Drawing Sheets

(56) References Cited

U.S. PATENT DOCUMENTS

2023/0087066 A1 * 3/2023 Lueders .............. G06F 16/2365
707/690

OTHER PUBLICATIONS

Chia-Che Tsai, A Study of Modern Linux API Usage and Compatibility: What to Support When You're Supporting. (Year: 2016).*
DeekshaM.Arya, Information correspondence between types of documentationfor APIs. (Year: 2020).*
Mikolas Janota, CLOPS: A DSL for Command Line Options. (Year: 2009).*

* cited by examiner

TRANSPARENTLY EXECUTING ACTIONS WITHIN A CONTAINERIZED CLOUD ENVIRONMENT

TECHNICAL FIELD

This document generally relates to distributed containerized cloud environments. More specifically, this document relates to transparently executing actions within a containerized cloud environment.

BACKGROUND

Container-orchestration systems, such as Kubernetes can be used to deploy, scale, and manage computer applications. In a container-orchestration system, an operator is a software component that handles lifecycle event of stateful applications. A control loop watches particular resources and reacts on state changes of these resources. In a Platform-as-a-Service offering, services, such as database services, may be defined as particular resources with subresources (containers, configurations, or secrets). An operator watches for the particular service resource and, in the case of a create/update/delete event, takes the appropriate actions, such as creating, updating, or deleting subresources.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
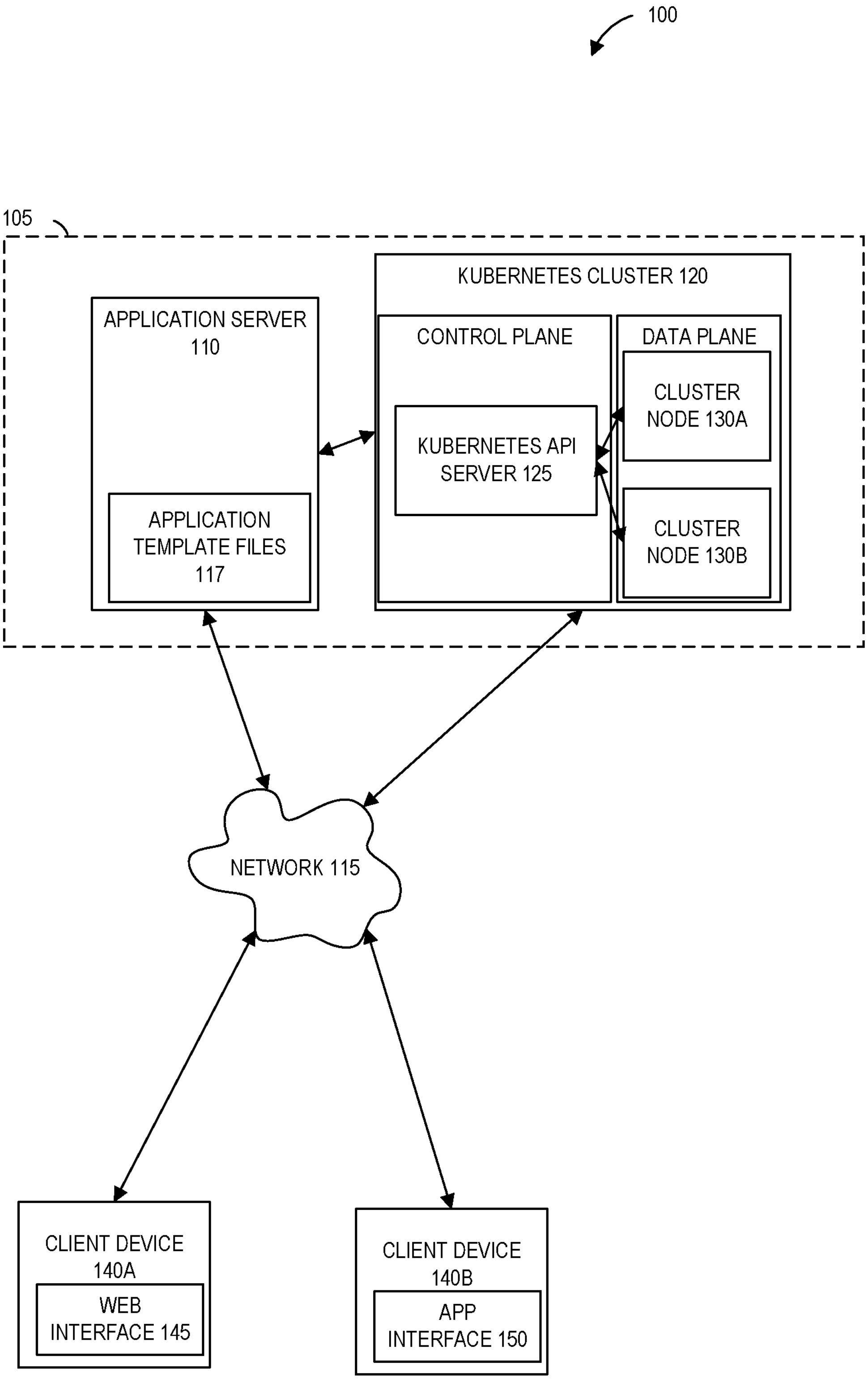
FIG. 1 is a network diagram illustrating a network environment suitable for using Kubernetes™ as a distributed operating system for a scalable application system, according to some example embodiments.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

A container orchestration system, such as Kubernetes™, may include a sophisticated and highly integrated user-facing platform that handles activities such as billing, auditing, connections management, and initiation of provisioning and deprovisioning of services. An operator pattern may be used to automate complicated processes, such as a provisioning of a database in a particular cloud environment. In an operator pattern, a component called an operator watches specific resources that describe a desired state (e.g., about a particular database instance) and acts upon changes in these resources.

Infrastructure teams may use a sophisticated command line tool to maintain and manage the systems. Such a tool is used to automate the deployment process of the surrounding cloud environments (e.g., Kubernetes™ clusters). It is responsible for retrieving and adding secrets/certificates to infrastructure services running in these environments and is used by cloud engineers to interact with the system in various ways. Furthermore, automatic, regularly running jobs execute commands to, for example, clean up resources, collect logs, or replicate the provisioning of services in a continuous integration/continuous deployment pipeline, through such a tool or multiple tools.

A technical problem is encountered, however, in integrating these two different types of interactions within a Platform-as-a-Service (PaaS) infrastructure. When engineers want to test new features, they may rely on the command line tool during the development and testing process, but it behaves differently from the operators/services that would be used if a customer activates that feature. This can lead to problems for engineers who want to replicate customer behavior and can even lead to bugs that are only discovered in end-to-end testing or not discovered at all. At the end, this leads to longer delivery times, increased cost for feature development, and service level agreement (SLA) violations.

Another technical challenge is that certain actions, such as maintenance actions, can only be performed through the infrastructure tool from outside of the cluster. This leads to a massive external infrastructure where jobrunners, such as Jenkins, are then used to run a multitude of complicated actions against a multitude of complex environments. Jenkins is an open-source automation server that helps automate the parts of software development related to building, testing, and deploying applications, as well as facilitating continuous integration and continuous delivery. It is a server-based system that runs in servlet containers. Use of jobrunners to run a multitude of complicated actions against a multitude of complex environments, however, creates unnecessary external dependencies and reduces the reliability of the system. It further increases complexity, because tasks that are logically part of a particular cloud environment are not managed and run within that environment, but rather in some external system. Outages or errors in these external systems (that often manage a multitude of cloud environments) can lead to large-scale outages that affect thousands of customers.

Furthermore, there are considerable differences in skills among cloud engineers. Some engineers who are more used to scripting, system administration, and continuous integration/continuous delivery workflows are very comfortable with using scripts and scripting languages, while other engineers who are more focused on the infrastructure and its components are more comfortable maintaining resource definitions and infrastructure-specific configurations, which are often maintained in Yet Another Markup Language (YAML) or JavaScript™ Object Notation (JSON). It is challenging for the engineers to execute tasks in unfamiliar ways. This leads to inefficiencies in the development process, less maintainable code, increased bugs, and reduced overall stability of the system.

A further technical challenge is that in large container orchestration cloud environments, it can be difficult to clean up cloud resources that are not needed anymore.

In an example embodiment, a templating and detemplating component that allows for transparent integration with a cloud environment irrespective of the implementation is provided. It allows for two distinct ways of making changes in the cloud environment: (1) execution of commands through a command line tool; and (2) creation of custom resources by a user or system component.

With respect to the command line tool, this tool allows users to execute commands in a way that, dynamically, either performs the desired action directly or results in the creation of a custom resource (CR) within the cloud environment, which is then used by operators to bring the actual state of the resource to the desired state. This allows the user (e.g., a cloud engineer or jobrunner) to imitate the behavior of the system from a customer perspective.

The execution flow of the command line tool may be as follows. First, a user can execute a particular command. The command line tool knows whether the command can be executed directly in its environment or whether a CR-based execution is necessary. If the command can be executed directly, it will do so. If it requires a CR, then it sends a request to the API of the templating engine. A templating algorithm then creates the resource (e.g., YAML definition) based on the parameters it received in the request. A CR creation component then applies the resource to the respective cloud environment, and the operators watching the CR reconcile the actual and the desired state of the CR, just as if the CR is created through other systems, such as via customer action.

With respect to the creation of custom resources by a user or system component, the user or system component can create a command line execution custom resource that represents the execution of a particular command in the command line tool with particular parameters. A detemplating engine watches the command line execution custom resource and has a reconciliation loop that reconciles the current state of the resource with its desired state. This loop is effectively doing the same job that a reconciliation loop in an operator/controller does.

The execution flow may be described as follows. First, the command line execution CR is created with a set of required parameters. This may include the command to execute, the arguments to be passed to the command, and a security token (or multiple tokens) used for authentication and authorization of the command line tool. After creation, the CR will have a status of "waiting for execution." A reconciliation loop in the detemplating engine will be informed about the new command line execution CR and may set its status to executing. The detemplating algorithm reads the CR and converts the parameters into a data object. The command executor converts the object into an API request and sends the API request and the required security token to the command line tool. The command line tool provides an API for retrieving requests. The requests are handled in the same way as if the command was entered in the command line. The result of the command line execution is written into the CR 206B, and the status of the CR 206B is updated to "finished execution."

It should be noted that while Kubernetes™ will be discussed throughout this disclosure, the same techniques may be applied to achieve the same benefits using any containerized cloud environment, and the disclosure shall not be interpreted as limiting the scope of protection to Kubernetes™ unless explicitly recited.

Kubernetes™ is a system for automating deployment, scaling, and management of containerized applications. Application containerization is a virtualization method used by operating systems to deploy and run distributed applications without launching an entire virtual machine for each application.

Containerized applications have advantages over standard applications. When a standard application is installed on a server, libraries required by the application are also installed. Thus, if multiple applications are installed, the libraries on the server are an amalgamation of the libraries required by each of the multiple applications. If one application installs a different version of a library used by another application, the first installed version is overwritten. As a result, an application may use a version of a library that was not tested with the application, which may further result in unexpected behavior.

Kubernetes™ containers, by virtue of being so modular, are quite conducive to scaling of in-memory database instances. Kubernetes™ containers are called pods. Each pod is scheduled on a specific host and encapsulates a container for each of one or more applications. If the host becomes unavailable, Kubernetes™ automatically instantiates the instance on a different host, greatly easing maintenance.

A stateful service is one in which state data is persisted. An in-memory database may be used to persist the state for these stateful services, but they can be managed in Kubernetes™ clusters using an application program interface (API) extension of a custom resource definition (CRD). A CRD is a set of parameters used by Kubernetes™ in managing the lifecycle of Kubernetes™ objects, such as pods. In an example embodiment, stateful applications managed by Kubernetes™ custom resources are utilized with the behavior toggles. That is, the lifecycle of the stateful application is managed by a custom resource and its controller. This concept is known as a Kubernetes™ operator.

Lifecycle of the application would include provisioning and decommissioning application instances, as well as any configuration changes of the applications other than actually using the application.

Docker™ is a tool for creating, deploying, and running applications using containers.

Custom resources are places where configuration parameters are stored and where each file is managed by an operator component. This file contains various information about the installation, including an application program interface (API) version (which is actually the version of the configuration file), and an application kind (e.g., database, plugin, operator), as well as various other status fields. These API version and kind fields are an important concept of Kubernetes resources. They are key to a certain type of resource that can be managed by a controller. Kubernetes installations include certain resources, such as Pod, Deployment, Service, and Ingress, and also allow for custom resources, introduced by the use of the Kubernetes Operator Framework.

Custom resources are defined by a custom resource definition (CRD) and managed by a controller. Any custom resources created in a Kubernetes cluster have to specify the key to the resource definition it fulfils (API version and kind). If the key is known in the cluster, the resource will be checked against the resource definition. If it compiles, then it gets created and the controller of that resource type will reconcile the resource (e.g., read its content and perform the work to create a state in the cluster that was described by that resource). A controller gets registered in the cluster as being able to reconcile a specific resource type identified by API version and kind.

FIG. 1 is a network diagram illustrating a network environment 100 suitable for using Kubernetes™ as a distributed operating system for a scalable application system, according to some example embodiments. The network environment 100 includes a network-based application 105, client devices 140A and 140B, and a network 115. The network-based application 105 is provided by an application server 110 in communication with a Kubernetes cluster 120. The application server 110 accesses application template files 117 to configure and deploy an application to the Kubernetes™ cluster 120 via the Kubernetes™ API server 125 interacting with a set of cluster nodes 130A, 130B. The containerized application is provided to the client devices 140A and 140B via a web interface 145 or an application interface 150. The application server 110, the Kubernetes™ API server 125, the cluster nodes 130A and 130B, and the client devices 140A and 140B may each be implemented in a computer system, in whole or in part, as described below. The cluster nodes 130A and 130B may be referred to collectively as the cluster nodes 130 or generically as a cluster node 130. The client devices 140A and 140B may be referred to collectively as client devices 140 or generically as a client device 140.

The application server 110 provides a user interface for selecting an application to the client devices 140. The Kubernetes™ API server 125 provides an interface to the Kubernetes™ cluster 120 and deploys applications to the cluster nodes 130. The selected application may be invoked via a virtual system application. The client device 140 may provide identifying information to the application server 110, and the identifying information may be used by the Kubernetes™ API server 125 or the virtual system application to determine a particular instance of the selected application to invoke.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 110, the Kubernetes™ API server 125, the cluster nodes 130A-130B, and the client devices 140A-140B may be connected by the network 115. The network 115 may be any network that enables communication between or among machines, databases, and devices. Accordingly, the network 115 may be a wired network, a wireless network (e.g., a mobile or cellular network), or any suitable combination thereof. The network 115 may include one or more portions that constitute a private network, a public network (e.g., the Internet), or any suitable combination thereof.

A control loop is a type of Kubernetes™ controller that watches particular resources and reacts on state changes of these resources. In a PaaS offering, services (e.g., database services are often defined as particular resources with subresources (Containers, configurations, secrets, etc.). An operator watches for the particular service resource and in the case of a create/update/delete event takes the appropriate actions, such as creating/updating/deleting subresources. An operator comprises at least one controller.

Helm is a tool that streamlines installing and managing Kubernetes™ applications. It may be described as a package manager for Kubernetes™. Helm uses a packaging format called charts. A chart is a collection of files that describe a related set of Kubernetes™ resources. A single chart might be used to deploy something simple, like a Memcached pod, or something complex, like a full web app stack with Hypertext Transport Protocol (HTTP) servers, databases, caches, etc.

Hyperscale is the ability of an architecture to scale appropriately as increased demand is added to the system. This may involve the ability to seamlessly provide and add computer, memory, networking, and storage resources to a given node or set of nodes that make up a larger computing, distributing computing, or grid computing environment. Hyperscale computing may be used to build a robust and scalable cloud, big data, map-reduce, or distributed storage system.

Figure 2:
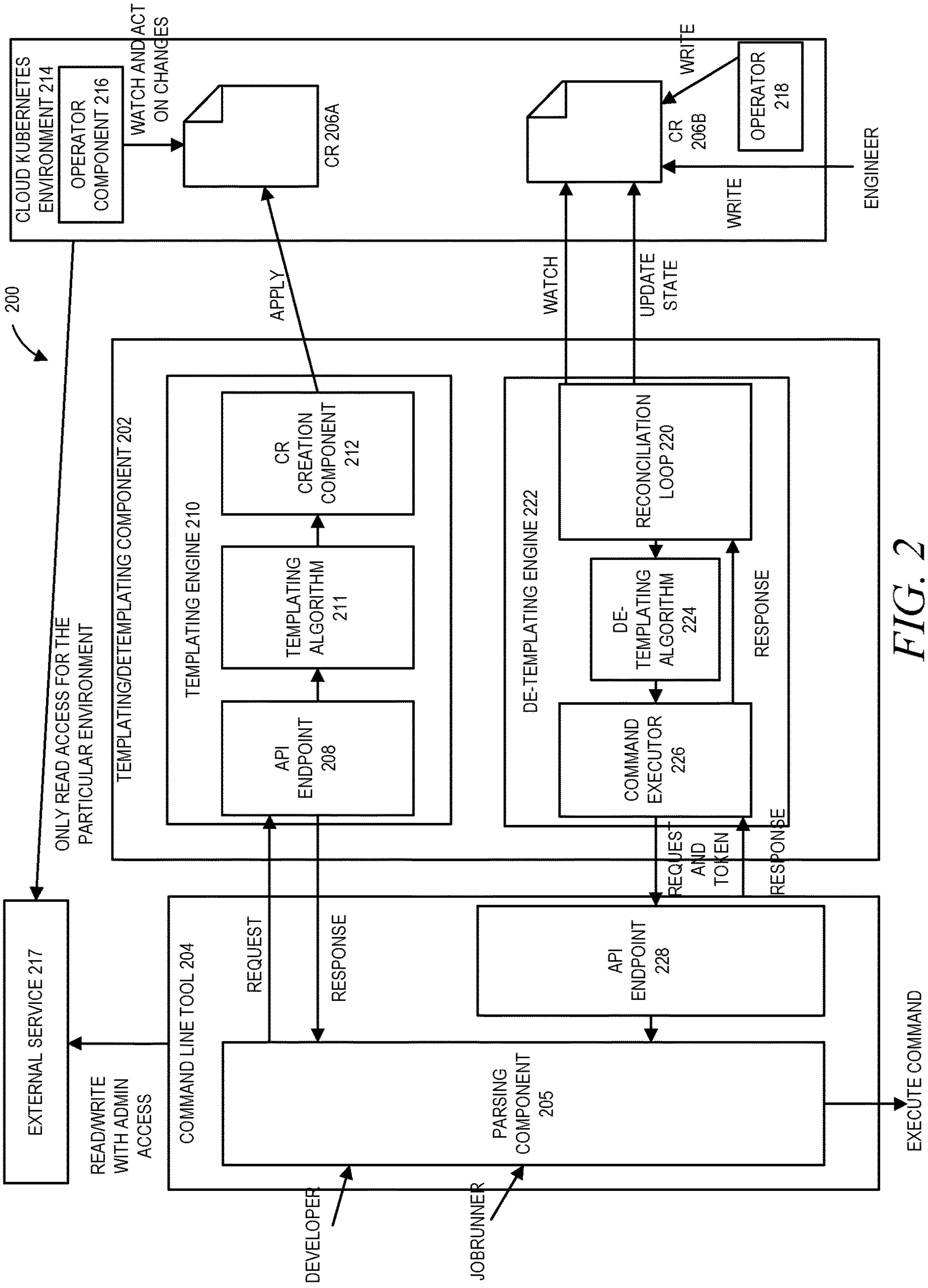
FIG. 2 is a block diagram illustrating a system, in accordance with an example embodiment.

FIG. 2 is a block diagram illustrating a system 200, in accordance with an example embodiment. Here, a templating/detemplating component 202 is provided that allows users and machines to use either a command line tool 204 to create a command that results in a CR 206A being created that is then applied to a cloud Kubernetes environment 214 and subsequently reconciled by an operator 218, or directly create the custom resource 206B. With respect to use of a command line tool 204, a user (or machine) may use this tool to execute a command, or alternatively a job runner can do similarly. The command line tool 204 knows whether the command can be executed directly in its environment, or whether a CR-based execution is necessary, by using a parsing component 205, which parses the command. If the command requires a CR operator pattern-based execution, then the command line tool 204 sends a request to an Application Program Interface (API) endpoint 208 on a templating engine 210 of the templating/detemplating component 202. A templating algorithm 211 then creates a resource based on the parameters the API endpoint 208 received in the request. More particularly, the templating algorithm 211 may access a template repository (not pictured) that contains one or more templates. The template can be, but is not limited to, a custom resource representing an in-memory database. Each template may correspond, for example, to a different type of request. Each template may contain lines of a CR but may have open fields where parameters can be filled in. More particularly, the template may contain the syntax of a CR with open fields. The templating algorithm creates the CR by applying the parameters from the request to the open fields in the CR. A CR creation component 212 then applies the CR to the respective cloud environment 214, specifically creating CR 206A in the cloud Kubernetes™ environment 214. An operator component 216 in the cloud Kubernetes™ environment 214 then watches the CR 206A and acts on changes to the CR 206A.

A separate external service 217 may provide additional services used for execution of commands, such as performing as a secret engine that provides security features. The access rights granted to the CR 206A may be limited to only read access to the particular cloud environment 214, as enforced by the separate external service 217.

For the second mode of interaction, either an operator 218 or a user or machine can directly create/write CR 206B in the cloud Kubernetes™ environment 214. The CR 206B may contain the command to execute, the arguments to be passed to the command, and a security token or tokens used for authentication and authorization at the command line tool 204. A reconciliation loop 220 within a detemplating engine 222 of the templating/detemplating component 202 watches a command line execution custom resource, such as CR 206B in the cloud Kubernetes™ environment. This reconciliation loop 220 may effectively perform the same task as a reconciliation loop in an operator/controller. The reconciliation loop 220 detects the CR when it is not yet executing. When the reconciliation loop 220 detects that the CR 206B has had its status set to "waiting for execution", the reconciliation loop 220 then sets the status to "executing" and a detemplating algorithm 224 reads the CR 206B and converts it to an object. A command executor 226 converts the object into an API request and sends the API request, as well as the required security token contained in the CR 206B, to an API endpoint 228 in the command line tool 204. The security token mechanism helps ensure the principle of least privilege, because the token can be bound to the particular environment. Thus, the command line tool 204, when executing the command that was defined in the command line execution CR 206A of the cloud Kubernetes environment 214, uses the security token from that cloud environment and therefore ensures (e.g., if the action to execute is the clean up of Kubernetes resources) that only resources from the cloud Kubernetes environment 214 can be deleted, not resources from other cloud environments. This fine-grained authorization was not possible in prior art solutions as the jobrunners execute the cleanup for all cloud environments, and therefore need to access all resources.

The API requests are then handled in the same way as if the command was entered as a command line.

The following is an example of a command entered directly into the command line tool 204 that the parsing component 206 recognizes as needing a CR-based execution:

```
cl create_resource \
--resource_type database \
--resource_id c89sdx \
--memory_size 30GB\
--cpu 2 cores \
--attr3 ...
--attr4
```

The CR 206A created in the cloud Kubernetes environment 214 may then be as follows:

```
type: database
id: c89sdx
status: waiting_for_creation
spec:
  memory_size: 30GB
  cpu: 2 cores
  attr3: ...
  attr4: ...
```

The following is an example of CR 206B:

```
type: cmd-line-execution
id: f82afh
token: qefx89-28fds9
status: waiting_for_execution
spec:
  command: rotate_credential
  args:
    secret_engine: address
    secret_path: /f82afh
    validity: 2022-03-15T05:50:54+00:00
```

Then the corresponding command line at the command line tool 204 will be:

```
cl rotate_credential \
--resource_id f82afh \
--secret_engine address \
--secret_path "/f82afh" \
-token "qefx89-28fds9"
--validity unixtimestamp
```

One particular advantage of this example embodiment is that cleanup commands can be instructed from within a cluster, instead of requiring them to be performed as a job from an outside environment.

Figure 3:
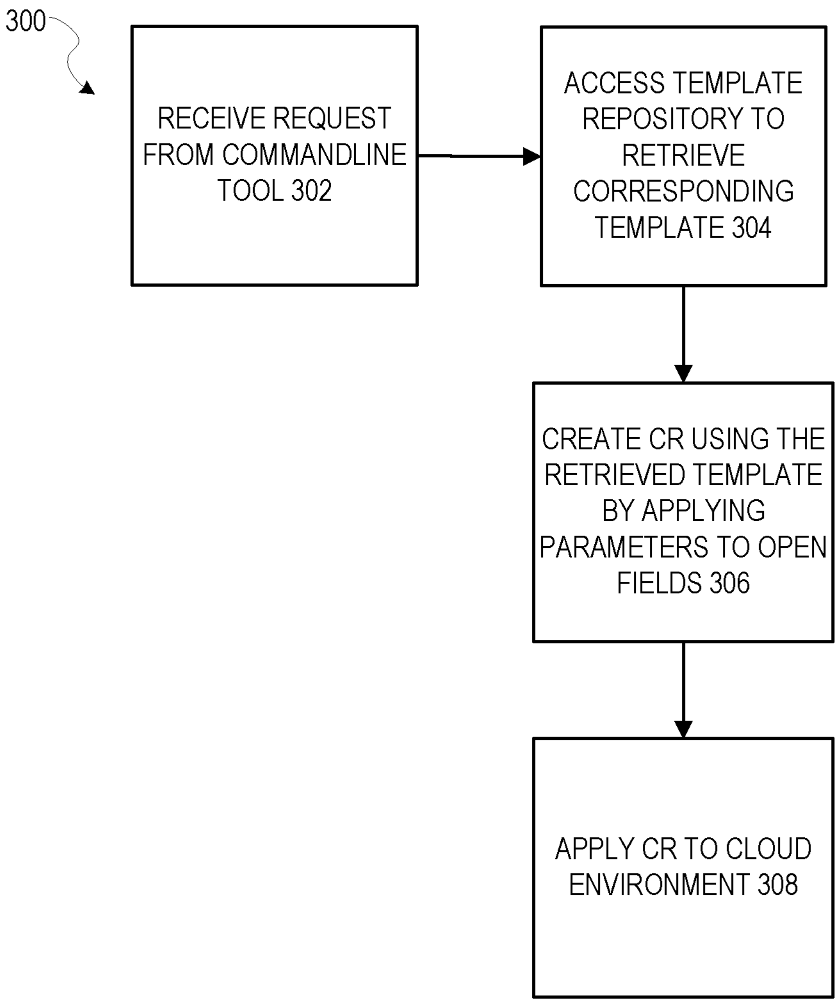
FIG. 3 is a flow diagram illustrating a method for performing a templating algorithm, in accordance with an example embodiment.

FIG. 3 is a flow diagram illustrating a method 300 for performing a templating algorithm, in accordance with an example embodiment. Here, at operation 302, a request is received from a command line tool. At operation 304, a template repository is accessed to retrieve a corresponding template. This may include, for example, identifying a type of the request and retrieving a template corresponding to that type.

At operation 306, a custom resource is created using the retrieved template by applying parameters in the request to open fields in the template. At operation 308, the custom resource is applied to a cloud environment.

Figure 4:
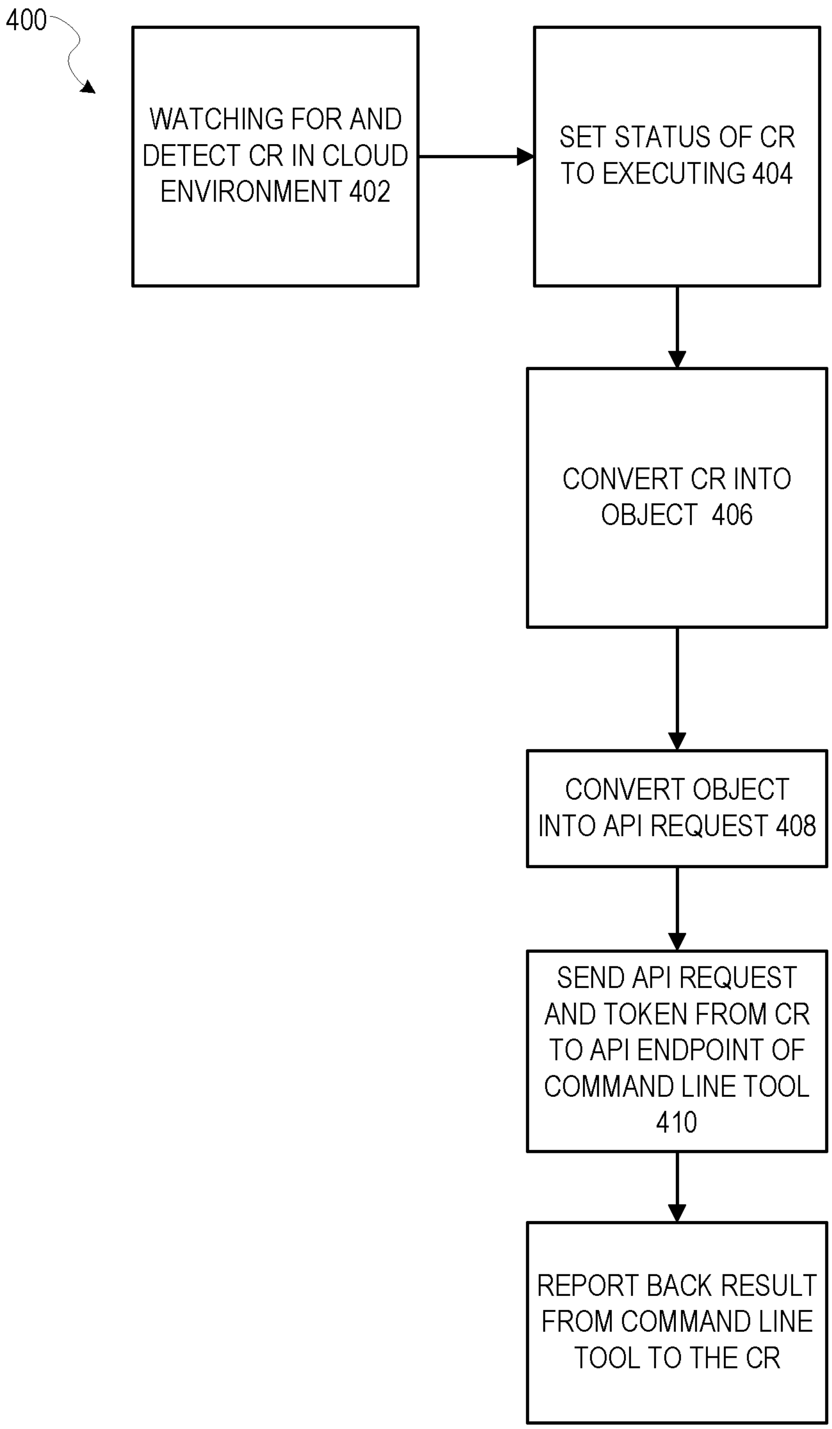
FIG. 4 is a flow diagram illustrating a method for performing a detemplating algorithm, in accordance with an example embodiment.

FIG. 4 is a flow diagram illustrating a method 400 for performing a detemplating algorithm, in accordance with an example embodiment. Here, at operation 402, a reconciliation loop watches for and detects a custom resource in a cloud environment. The custom resource may have been created by a user, or by an operator in the cloud environment.

At operation 404, the status of the custom resource may be set to executing. At operation 406, the custom resource is converted into a data object. At operation 408, the object is converted into an API request. Then, at operation 410, the API request and a token from the custom resource are sent to the API endpoint of a command line tool. At operation 412, the result is reported back from the command line tool and eventually written into the CR, also setting the status to "finished execution".

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:

at least one hardware processor; and a computer-readable medium storing instructions that, when executed by the at least one hardware processor, cause the at least one hardware processor to perform operations for operating an in-memory database operator within a container orchestrator, the operations comprising:

receiving, at an application program interface (API) endpoint of a templating engine, a request from a command line tool, the request written in a command line syntax and including one or more parameters, the request having a request type;

identifying a template corresponding to the request type in a template repository, the template containing syntax of a custom resource with one or more open fields;

creating a first custom resource using the syntax of the custom resource from the template and applying the one or more parameters to the one or more open fields; and applying the first custom resource to a cloud environment.

Example 2. The system of Example 1, wherein the cloud environment is a container orchestration system cloud environment.

Example 3. The system of Examples 1 or 2, wherein the request is received from a parsing component in the command line tool, the parsing component sending the request in response to a determination that the request needs to be executed in the cloud environment.

Example 4. The system of any of Examples 1-3, wherein the first custom resource is watched and acted on by an operator component in the cloud environment.

Example 5. The system of any of Examples 1-4, wherein read only access is granted for the cloud environment based on communication with an external secret engine.

Example 6. The system of any of Examples 1-5, wherein the operations further comprise:

detecting at a reconciliation loop of a detemplating engine, a second custom resource in the cloud environment;

in response to the detecting, creating an object out of the second custom resource;

converting the object into an API request; and sending the API request along with a security token extracted from the second custom resource to an API endpoint on the command line tool, for execution by the command line tool.

Example 7. The system of Example 6, wherein the token is used by the command line tool to authenticate the request using an external secret engine.

Example 8. A method comprising:

receiving, at an application program interface (API) endpoint of a templating engine, a request from a command line tool, the request written in a command line syntax and including one or more parameters, the request having a request type;

identifying a template corresponding to the request type in a template repository, the template containing syntax of a custom resource with one or more open fields;

creating a first custom resource using the syntax of the custom resource from the template and applying the one or more parameters to the one or more open fields; and applying the first custom resource to a cloud environment.

Example 9. The method of Example 8, wherein the cloud environment is a container orchestration system cloud environment.

Example 10. The method of Examples 8 or 9, wherein the request is received from a parsing component in the command line tool, the parsing component sending the request in response to a determination that the request needs to be executed in the cloud environment.

Example 11. The method of any of Examples 8-10, wherein the first custom resource is watched and acted on by an operator component in the cloud environment.

Example 12. The method of any of Examples 8-11, wherein read only access is granted for the cloud environment based on communication with an external secret engine.

Example 13. The method of any of Examples 8-12, further comprising:

detecting at a reconciliation loop of a detemplating engine, a second custom resource in the cloud environment;

in response to the detecting, creating an object out of the second custom resource;

converting the object into an API request; and sending the API request along with a security token extracted from the second custom resource to an API endpoint on the command line tool, for execution by the command line tool.

Example 14. The method of Example 13, wherein the token is used by the command line tool to authenticate the request using an external secret engine.

Example 15. A non-transitory machine-readable medium storing instructions which, when executed by one or more processors, cause the one or more processors to perform operations comprising:

receiving, at an application program interface (API) endpoint of a templating engine, a request from a command line tool, the request written in a command line syntax and including one or more parameters, the request having a request type;

identifying a template corresponding to the request type in a template repository, the template containing syntax of a custom resource with one or more open fields;

creating a first custom resource using the syntax of the custom resource from the template and applying the one or more parameters to the one or more open fields; and applying the first custom resource to a cloud environment.

Example 16. The non-transitory machine-readable medium of Example 15, wherein the cloud environment is a container orchestration system cloud environment.

Example 17. The non-transitory machine-readable medium of Examples 15-16, wherein the request is received from a parsing component in the command line tool, the parsing component sending the request in response to a determination that the request needs to be executed in the cloud environment.

Example 18. The non-transitory machine-readable medium of any of Examples 15-17, wherein the first custom resource is watched and acted on by an operator component in the cloud environment.

Example 19. The non-transitory machine-readable medium of any of Examples 15-18, wherein read only access is granted for the cloud environment based on communication with an external secret engine.

Example 20. The non-transitory machine-readable medium of any of Examples 15-19, further comprising:

detecting at a reconciliation loop of a detemplating engine, a second custom resource in the cloud environment;

in response to the detecting, creating an object out of the second custom resource;

converting the object into an API request; and sending the API request along with a security token extracted from the second custom resource to an API endpoint on the command line tool, for execution by the command line tool.

Figure 5:
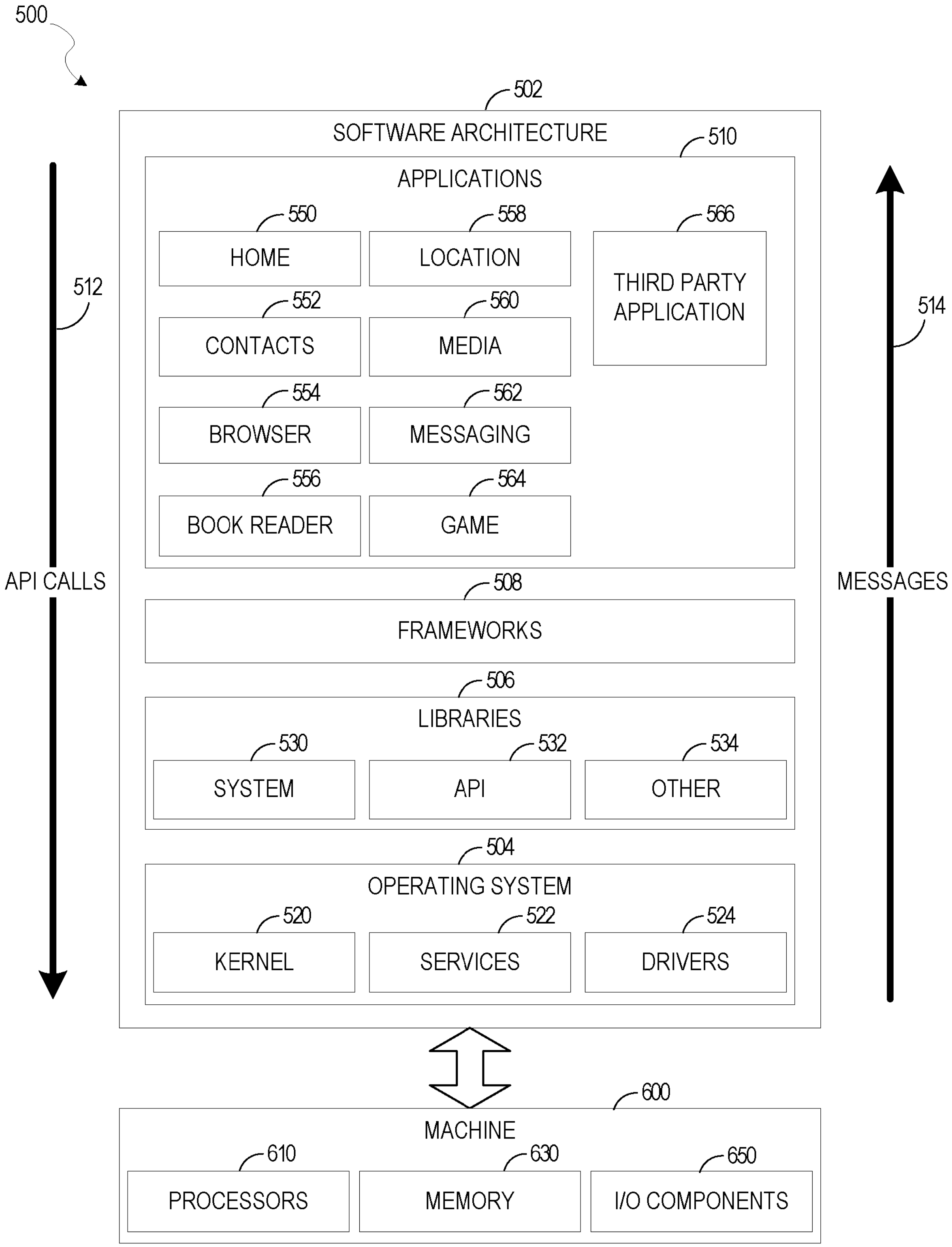
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionalities. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
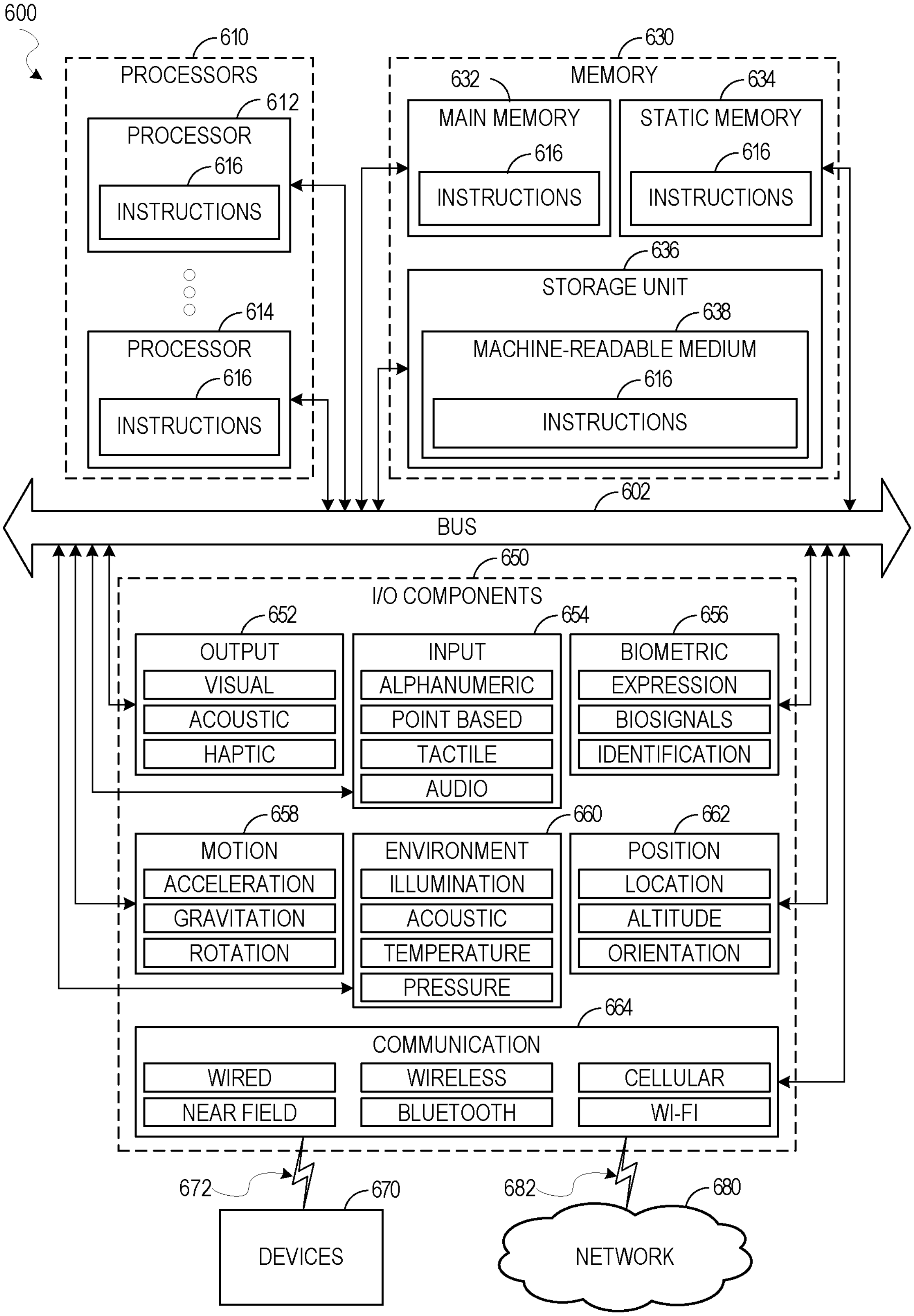
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the methods of FIGS. 3 and 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via IP geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., HTTP). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

at least one hardware processor;

a computer-readable medium storing instructions that, when executed by the at least one hardware processor, cause the at least one hardware processor to perform operations comprising:

receiving, at an application program interface (API) endpoint of a templating engine, a request from a command line tool, the request written in a command line syntax and including one or more parameters, the request having a request type indicating that the request is for a database resource;

identifying a template, uniquely corresponding to the request type, from a plurality of templates, each template in the plurality of templates uniquely corresponding to a different request type, in a template repository, the template containing syntax of a custom resource with one or more open fields;

creating a first custom resource using the syntax of the custom resource from the template and applying the one or more parameters to the one or more open fields;

applying the first custom resource to a cloud environment, causing an operator component to modify a state of a database instance within a container;

detecting at a reconciliation loop of a detemplating engine, a second custom resource in the cloud environment;

in response to the detecting, creating an object out of the second custom resource;

converting the object into an API request; and sending the API request along with a security token extracted from the second custom resource to an API endpoint on the command line tool, for execution by the command line tool.

2. The system of claim 1, wherein the cloud environment is a container orchestration system cloud environment.

3. The system of claim 1, wherein the request is received from a parsing component in the command line tool, the parsing component sending the request in response to a determination that the request needs to be executed in the cloud environment.

4. The system of claim 1, wherein the first custom resource is watched and acted on by an operator component in the cloud environment.

5. The system of claim 1, wherein read only access is granted for the cloud environment based on communication with an external secret engine.

6. The system of claim 1, wherein the token is used by the command line tool to authenticate the request using an external secret engine.

7. A method comprising:

receiving, at an application program interface (API) endpoint of a templating engine, a request from a command line tool, the request written in a command line syntax and including one or more parameters, the request having a request type indicating that the request is for a database resource;

identifying a template, uniquely corresponding to the request type, from a plurality of templates, each template in the plurality of templates uniquely corresponding to a different request type, in a template repository, the template containing syntax of a custom resource with one or more open fields;

creating a first custom resource using the syntax of the custom resource from the template and applying the one or more parameters to the one or more open fields;

applying the first custom resource to a cloud environment, causing an operator component to modify a state of a database instance within a container;

detecting at a reconciliation loop of a detemplating engine, a second custom resource in the cloud environment;

in response to the detecting, creating an object out of the second custom resource;

converting the object into an API request; and sending the API request along with a security token extracted from the second custom resource to an API endpoint on the command line tool, for execution by the command line tool.

8. The method of claim 7, wherein the cloud environment is a container orchestration system cloud environment.

9. The method of claim 7, wherein the request is received from a parsing component in the command line tool, the parsing component sending the request in response to a determination that the request needs to be executed in the cloud environment.

10. The method of claim 7, wherein the first custom resource is watched and acted on by an operator component in the cloud environment.

11. The method of claim 7, wherein read only access is granted for the cloud environment based on communication with an external secret engine.

12. The method of claim 7, wherein the token is used by the command line tool to authenticate the request using an external secret engine.

13. A non-transitory machine-readable medium storing instructions which, when executed by one or more processors, cause the one or more processors to perform operations comprising:

receiving, at an application program interface (API) endpoint of a templating engine, a request from a command line tool, the request written in a command line syntax and including one or more parameters, the request having a request type indicating that the request is for a database resource;

identifying a template, uniquely corresponding to the request type, from a plurality of templates, each template in the plurality of templates uniquely corresponding to a different request type, in a template repository, the template containing syntax of a custom resource with one or more open fields;

creating a first custom resource using the syntax of the custom resource from the template and applying the one or more parameters to the one or more open fields;

applying the first custom resource to a cloud environment, causing an operator component to modify a state of a database instance within a container;

detecting at a reconciliation loop of a detemplating engine, a second custom resource in the cloud environment;

in response to the detecting, creating an object out of the second custom resource;

converting the object into an API request; and sending the API request along with a security token extracted from the second custom resource to an API endpoint on the command line tool, for execution by the command line tool.

14. The non-transitory machine-readable medium of claim 13, wherein the cloud environment is a container orchestration system cloud environment.

15. The non-transitory machine-readable medium of claim 13, wherein the request is received from a parsing component in the command line tool, the parsing component sending the request in response to a determination that the request needs to be executed in the cloud environment.

16. The non-transitory machine-readable medium of claim 13, wherein the first custom resource is watched and acted on by an operator component in the cloud environment.

17. The non-transitory machine-readable medium of claim 13, wherein read only access is granted for the cloud environment based on communication with an external secret engine.

* * * * *